United States Patent [19]

Noorily

[11] Patent Number: 4,826,559
[45] Date of Patent: May 2, 1989

[54] APPARATUS FOR TAPPING OR SPLICING UNDERCARPET CABLE

[75] Inventor: Peter Noorily, Bridgewater, N.J.

[73] Assignee: Thomas & Betts Corporation, Bridgewater, N.J.

[21] Appl. No.: 31,296

[22] Filed: Mar. 26, 1987

[51] Int. Cl.[4] .............................................. H02G 3/08
[52] U.S. Cl. ............................... 156/433; 174/117 F
[58] Field of Search ............... 174/59, 36, 48, 117 F; 439/719, 709, 715; 156/433, 55; 269/903; 227/141

[56] References Cited

U.S. PATENT DOCUMENTS

| | | | |
|---|---|---|---|
| 1,022,423 | 4/1912 | Jordan . | |
| 1,132,355 | 3/1915 | Kistler . | |
| 1,173,394 | 2/1916 | Sunderland . | |
| 2,391,409 | 12/1945 | Geist et al. | 138/75 |
| 2,431,002 | 11/1947 | Vedder | 174/59 |
| 3,150,909 | 9/1964 | Deverell | 339/97 |
| 3,189,863 | 6/1965 | Leach | 339/99 |
| 3,720,778 | 3/1973 | Woertz et al. | 174/59 |
| 3,848,224 | 11/1974 | Olivero | 339/198 E |
| 3,934,072 | 1/1976 | Balde | 174/48 |
| 4,030,801 | 6/1977 | Bunnell | 339/121 |
| 4,209,660 | 6/1980 | Flachbarth et al. | 174/48 |
| 4,244,484 | 1/1981 | Guritz et al. | 220/3.7 |
| 4,289,370 | 9/1981 | Storck | 339/125 R |
| 4,536,050 | 8/1985 | Hung | 339/99 |
| 4,669,799 | 6/1987 | Vachhani et al. | 439/719 X |

FOREIGN PATENT DOCUMENTS

| | | |
|---|---|---|
| 2248136 | 9/1972 | Fed. Rep. of Germany . |
| 2254395 | 5/1974 | Fed. Rep. of Germany . |
| 1042694 | 11/1953 | France . |
| 1188281 | 9/1959 | France . |
| 1356387 | 2/1964 | France . |
| 1524271 | 4/1968 | France . |
| 442844 | 12/1948 | Italy . |
| 608915 | 9/1977 | Switzerland . |

OTHER PUBLICATIONS

Photographs of telephone/data cable splice connector produced by Hitachi Cable, dated prior to Filing date (3-26-87) of subject application.

Primary Examiner—Frank Spear
Attorney, Agent, or Firm—Robert M. Rodrick; Salvatore J. Abbruzzese

[57] ABSTRACT

The tapping or splicing apparatus for electrically connecting cables of the type having plural insulated conductors and drain wires comprises a base having an upper surface and a lower, substantially flat surface for juxtaposition with a floor surface. A plurality of insulation displacement contacts are supported on the base upper surface, each contact being configured to receive and electrically connect insulated conductors from at least two electrical cables. A detachable cover is secured to the base, the cover having an extent covering the contacts and including an upper surface that tapers downwardly toward the cover periphery. At the cover periphery there are plurality of cutouts extending through the upper surface of the cover, each cutout configured to accommodate a cable therein in a manner to present a gradual taper of the apparatus beneath carpets in an undercarpet wiring system to minimize its height effect in use.

13 Claims, 4 Drawing Sheets

APPARATUS FOR TAPPING OR SPLICING UNDERCARPET CABLE

FIELD OF THE INVENTION

This invention relates to an electrical connection apparatus and more particularly to an apparatus for tapping or splicing undercarpet cable specifically for telephone and data applications.

BACKGROUND OF THE INVENTION

Undercarpet wiring systems are in present use for commercial buildings, offices, and the like and are available from the Assignee of the subject application, Thomas & Betts Corporation as sold under the trademark VERSA-TRAK. Such undercarpet wiring systems provide power, data and telephone service to various work stations and/or locations in a particular area. Cable is laid directly on the floor of the building, is covered by carpet squares for ease of access thereto and appropriate outlets and receptacles are suitably provided for connection to the system.

While various tapping or splicing arrangements have been developed for the undercarpet power service, such electrical connections for data and telephone cable are not yet in wide use. With the advent of increased use of both telephone and data service in commercial environments, the need for tapping and splicing interconnections has also increased. Further, there is need for repair of data and telephone cable already in commercial use and for extending a main run of such cable for additional applications and users.

One known device in present use which is adaptable for telephone and data cable comprising two, three or four pair of conductors is a device which utilizes insulation displacement contacts for splicing an additional run of cable to a main cable run. Such device utilizes a base that supports the insulation displacement contacts and which fits into an opening in the undersurface of a cover. The cover has tapering ends which are provided in an attempt to minimize the profile of this device in use underneath a carpet. One problem with this device is that it is relatively thick and despite the tapering ends, a relative high profile is presented in use. Another limitation of this known device is that it is only capable of splicing, i.e., extending the run of cable rather than tapping angularly off such main run of cable.

SUMMARY OF THE INVENTION

It is a primary object of the present invention to provide an improved apparatus for tapping or splicing electrical cables.

It is a more specific object of the present invention to provide an apparatus for tapping or splicing electrical cables of the type primarily used in data and telephone applications.

In accordance with a preferred form of the invention, an apparatus for tapping or splicing electrical cables of the type having plural insulated conductors comprises a base having an upper surface and a lower, substantially flat surface for juxtaposition with a floor surface. A plurality of insulation displacement contacts are supported on the upper surface of the base, each of these contacts being configured to receive and electrically connect insulated conductors from at least two electrical cables. A cover detachably secured to the base has an extent covering the plurality of insulation displacement contacts, such cover including an upper surface tapering downwardly toward the periphery of the cover and having at such periphery plural cutouts extending through the upper surface, each of such cutouts configured to accommodate a cable therein.

In a particularly preferred arrangement of the invention, the apparatus is adapted for use with electrical cables of the type having drain wires, the tapping or splicing apparatus further including at least one grounding contact supported on the upper surface of the base, the grounding contact being configured to receive and electrically connect drain wires from at least two cables.

DETAILED DESCRIPTION OF THE PREFERRED EMBODIMENTS

Figure 1:
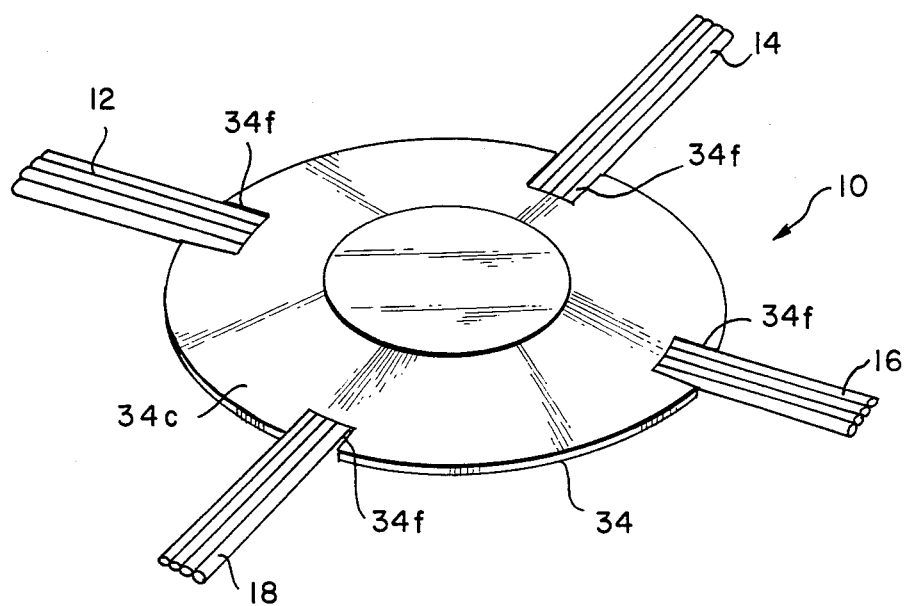
FIG. 1 is a top perspective view of the apparatus for tapping or splicing electrical cables shown in assembly with four electrical cables for use in an undercarpet wiring system.

Referring now to the drawings, there is shown in FIG. 1 an apparatus 10 in accordance with the invention for tapping or splicing electrical cables. As illustrated, the apparatus 10 is shown in assembly with four different cables that are received in the apparatus in electrical interconnected fashion along mutually perpendicular axes. Electrical cables 12, 14, 16 and 18 are of the type comprising a plurality of insulated conductors and drain wires encased in a jacket of insulation material. As shown, each cable 12, 14, 16 and 18 is particularly useful for providing both data and telephone service and each comprises four pairs of conductors. It should be understood, however, that other types of cables with different numbers of conductors may also be used with the apparatus of the subject invention. The subject apparatus has particular application with flat multiconductor cables used in undercarpet wiring systems.

Figure 2:
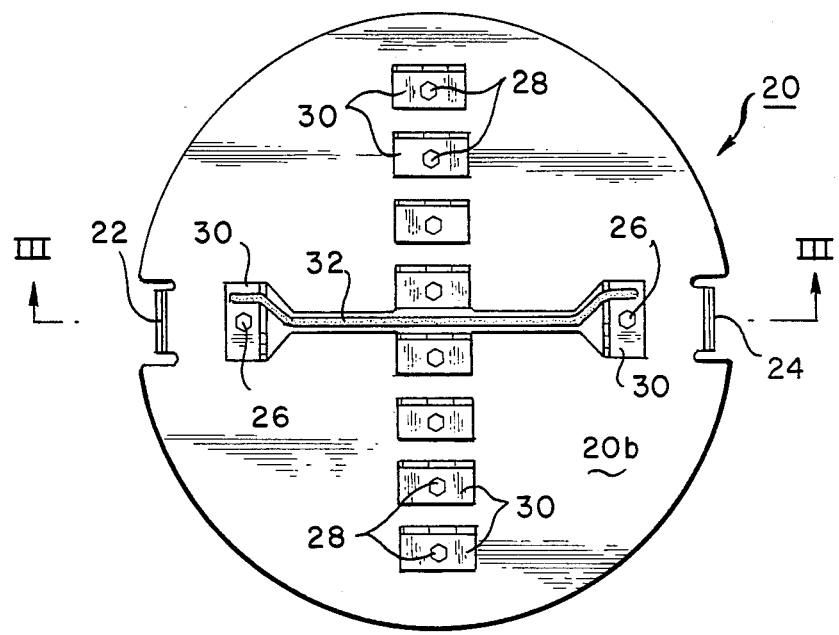
FIG. 2 is a top plan view of the base of the subject apparatus showing a plurality of insulation displacement contacts thereon and two grounding contacts, commonly interconnected by a wire.
Figure 3:
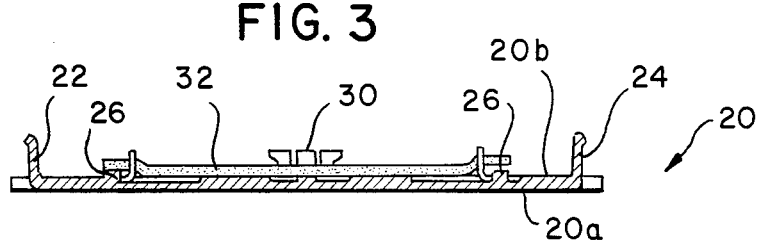
FIG. 3 is a cross-sectional view of the base of FIG. 2 as seen along viewing lines III—III thereof.

The details of the apparatus are now more fully described with reference to FIGS. 2–6. In FIGS. 2 and 3, a base 20 of the apparatus comprises a generally flat circular member of insulative material, preferably nylon. The base 20 has a lower surface 20a that is adapted to be placed in juxtaposition to a floor surface of a building and an opposed upper surface 20b. Diametrically opposed from each other, are a pair of upstanding, flexible latching arms 22, 24 that project upwardly from surface 20b and, as will be described, are adapted for latchable engagement with the apparatus cover. Along the same diametrical axis as the latching arms there are a pair of posts 26 projecting upwardly of base surface 20b. Along an axis perpendicular to the axis of the posts 26, there are a plurality of posts 28 similarly projecting upwardly of base surface 20b. In the preferred form, the base 20 inclusive of the latching arms 22, 24 and the posts 26 and 28 is fabricated as an integral element.

Figure 4:
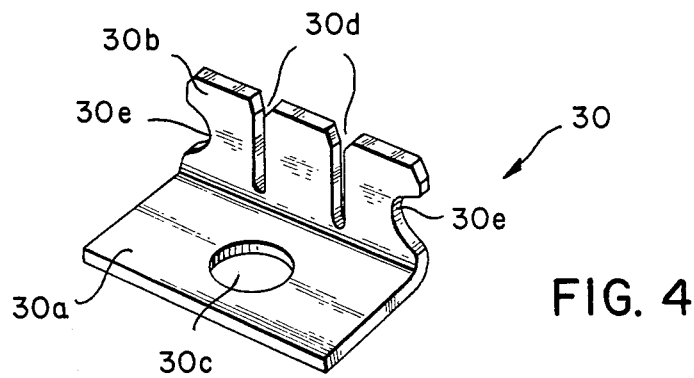
FIG. 4 is a top perspective view of one insulation displacement contact of the type depicted on the base of FIG. 2.

Suitably affixed to each of the posts 28 is an insulation displacement contact IDC 30, the details of which are depicted in FIG. 4. Contact 30 is of generally L-shaped configuration having a planar lower portion 30a and an upstanding vertical portion 30b. A suitable opening 30c is provided through the lower portion 30a for receipt therein of the posts 28. In the upstanding wall 30b there are a pair of slots 30d that are particularly configured to receive insulated conductors in insulation displacement manner as is known in the art. A pair of notches 30e is provided in the side walls of the upstanding portion 30b so as to accommodate drain wires during cable interconnection, as will be described.

Referring again to FIGS. 2 and 3, a contact 30 is received on each of the posts 28 and suitably affixed thereto by deforming the posts 28 so as to retain the contacts 30 thereon. Similarly, a pair of contacts 30 is likewise received on posts 26 and suitably affixed thereto. The contacts 30 on posts 26 are connected electrically in common by a bridging wire 32 that is received in insulation displacement fashion in each of these contacts 30 and extends generally perpendicularly across the contacts 30 on posts 28. It should be understood that while wire 32 effectively serves to electrically common contacts 30 on posts 26, other suitable commoning means may be provided.

Figure 6:
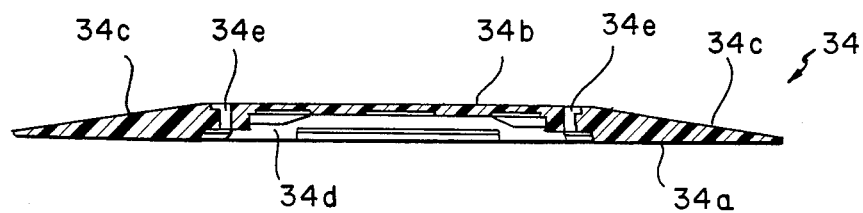
FIG. 6 is a cross-sectional view of the cover of FIG. 5 as seen along viewing lines VI—VI thereof and inverted 180° for clarity purposes.
Figure 5:
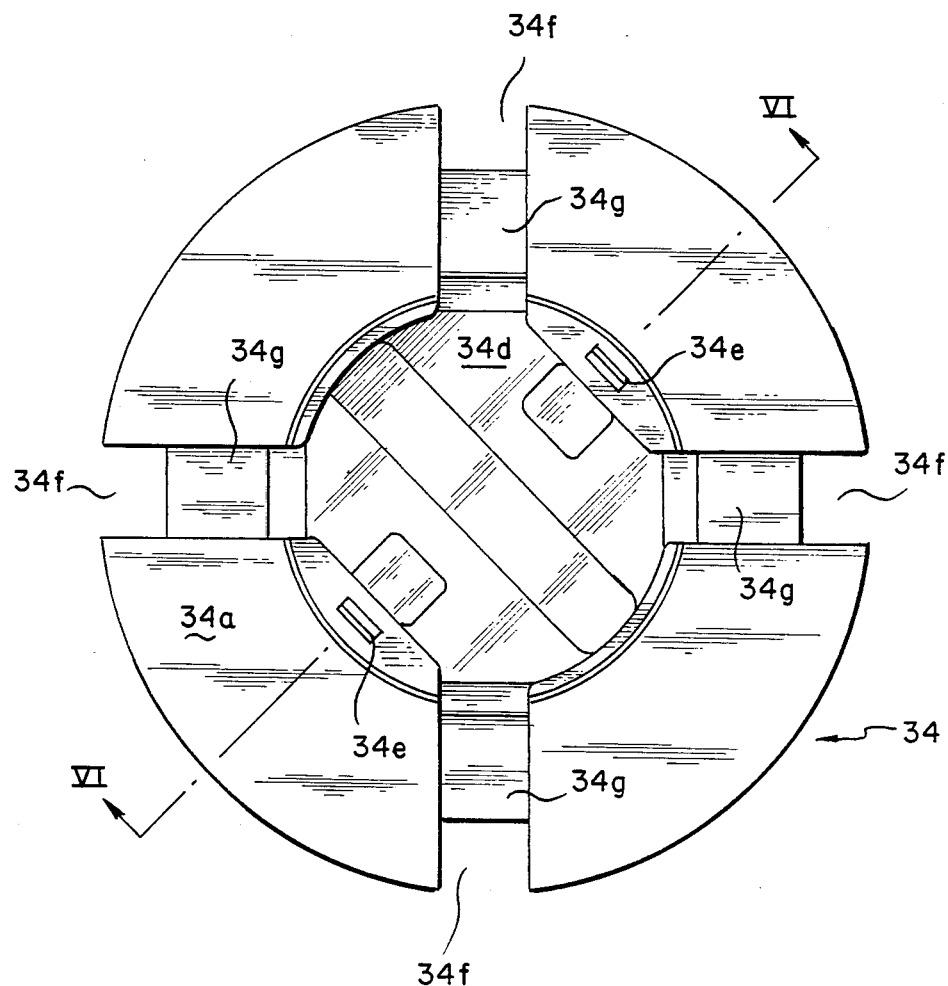
FIG. 5 is a bottom plan view of the cover of the subject apparatus.

Referring now to FIGS. 5 and 6 the details of the apparatus cover are described. Cover 34 comprises a generally circular member having a substantially flat, lower surface 34a and an opposed upper surface 34b. The upper surface 34b tapers downwardly in surface 34c from the center portion of the cover 34 towards its periphery. Extending into the cover 34 through the the lower surface 34a and generally centrally thereof is a pocket 34d. Adjacent the pocket 34d and spaced diametrically across are a pair of openings 34e, particularly configured to releaseably latchingly receive the flexible latching arms 22-24 on the base 20. Equally spaced about the periphery of the cover 34 and along generally mutally perpendicular axes are cutouts 34f as shown in FIG. 5. Cutouts 34f extend inwardly of the cover 34 toward the center thereof and through both the lower surface 34a and the upper surface 34b. Oriented on the same axes as the cutouts 34f are recesses 34g extending through the lower surface 34a and into the cover 34, recesses 34g each communicating with a cutout 34f and with the pocket 34d. The pocket 34d is particularly configured to receive therein the base 20 with contacts 30 thereon such that the lower surface 20a of the base is substantially flush with the lower surface 34a of the cover 34 in assembly.

Figure 7:
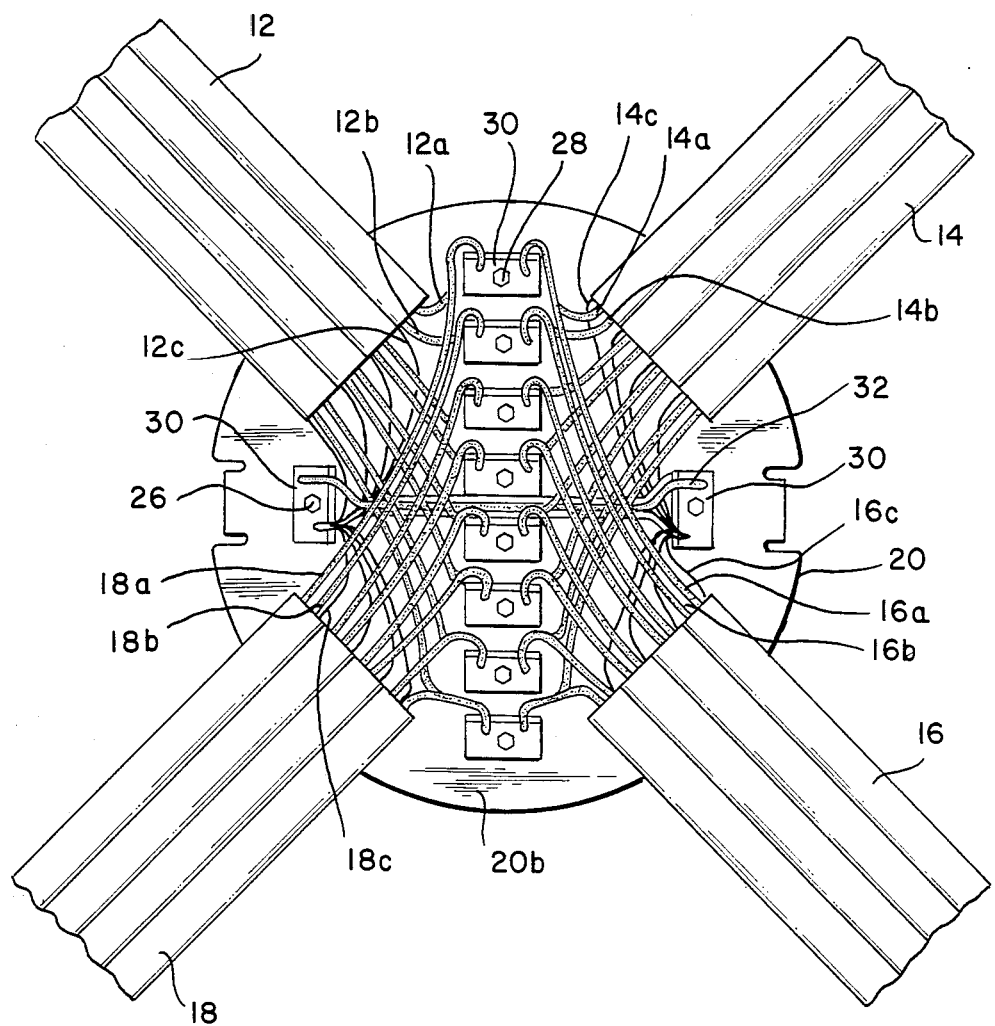
FIG. 7 is a top plan view of the assembly of FIG. 1 showing the apparatus of the subject invention with the cover removed.

Turning now to FIGS. 7 and 1, the assembly of the apparatus with electrical cables is described. As indicated hereinabove, each of the cables 12, 14, 16 and 18 comprise, in the preferred embodiment shown, four pairs of conductors. For example, conductors 12a and 12b are each individually insulated and these comprise a first pair of conductors. Associated with each pair of conductors is a drain wire such as 12c, each pair of conductors 12a and 12b together with the drain wire 12c being suitably surrounded by an electrical shield (not shown) as is conventionally known. The other cables namely, 14, 16 and 18 have similarly provided pairs of cables with drain wires.

As illustrated in FIG. 7, the four cables, 12, 14, 16 and 18 are received on the upper surface 20b of the base 20 along generally perpendicular axes that are oriented obliquely relative to the line of contacts 30 on posts 28. As such, these contacts 30 are accessible to all the conductors of the cables 12, 14, 16 and 18. As shown, conductors 12a, 14a, 16a, and 18a are all terminated in one contact 30 which is shown in FIG. 7 as the uppermost in the linear array. Conductors 12a and 18a are terminated by a suitable tool in insulation displacement contact fashion in one of the contact slots 34d while conductors 14a and 16a are similarly terminated in insulation displacement fashion in the other contact slot 34d. Also, conductors 12b, 14b, 16b and 18b are connected in common in like manner with the next contact down in the array and the remaining conductors are connected in similar manner until all the conductors are terminated. The drain wires, for example 12c and 18c, are terminated to one of the contacts disposed on post 26 of the base 20 which contacts serve as grounding contacts. Drain wires 12c and 18c may be initially received in a slot 34d or suitably wrapped around the upper portion 30b of the contact 30 within the side notches 30e. In like manner, drain wires 14c and 16c are terminated to the opposing contact 30 which is electrically connected in common thereto by wire 32. The remaining drain wires from cables 12 and 18 are likewise connected to the leftward contact 30 as shown while the remaining drain wires from cables 14 and 16 are connected to the rightward contact 30. As such, all drain wires are connected at the same electrical potential.

Upon completion of the termination of the cable conductors, the cover is placed over the base with terminated cables thereon in a manner as illustrated in FIG. 1. The cutouts 34f are oriented to coincide with the alignment of the cables 12, 14, 16 and 18 so that, in assembly, cables reside in the recesses 34g and the cutouts 34f. The cutouts 34f enable the cables to be received through the tapering surfaces 34c to thereby provide a feathered edge of the apparatus which effectively minimizes and spreads the apparatus bulge beneath a carpet. Furthermore, during assembly, as referred to hereinabove, the base 20 is fully received in the pocket 34d of the cover and during such assembly the outer jackets of the cables 12, 14, 16 and 18 are suitably compressed between portions of the cover and base to provide a strain relief to the cables. The latching arms 22, 24 are received in the openings 34e for releasably holding the assembled apparatus together.

Having described the preferred embodiments of the subject invention, it should now be appreciated that the apparatus as described herein provides advantages and benefits to the art. For example, a more aesthetically pleasing appearance is provided by minimizing the height effect of the apparatus by the particularly configured cover. Furthermore, cables may be spliced by adding additional runs thereto along a common axis or taps may be made to the main run by attaching cables at right angles. As can be further appreciated, the apparatus of the subject invention also facilitates making repairs of undercarpet cables. Having described the preferred embodiments of the subject apparatus for tapping or splicing electrical cables, it should also be understood that variations or modifications may be made thereto without departing from the contemplated scope of the invention. For example, while the apparatus shown and described herein is adapted to interconnect four cables, other suitable numbers of cables may be connected, with a minimum of two such cables. The number of contacts could then be appropriately adjusted to accommodate the cables to be connected. It can also be appreciated that the grounding contacts that are provided to interconnect the drain wires of the cables do not have to be of insulation displacement contact structure, but may include any suitable connection means. Accordingly, the preferred embodiments described herein are intended in an illustrative rather than a limiting sense. The true scope of the invention is set forth in the claims appended hereto.

I claim:

1. An apparatus for tapping or splicing electrical cables of the type having plural insulated conductors, comprising:
   a base having an upper surface and a lower substantially flat surface for juxtaposition with a floor surface;
   a plurality of insulation displacement contacts supported on said upper surface of said base, each of said contacts being configured to receive and electrically connect insulated conductors from at least two electrical cables; and
   a cover detachably secured to said base and having an extent covering said plurality of insulation displacement contacts, said cover including an upper surface having a portion tapering downwardly toward the periphery of said cover and having at such periphery plural cutouts extending through said periphery and through the tapering portion of said upper surface, each of said cutouts configured to accommodate a cable therein.

2. Apparatus according to claim 1, wherein said cover includes a lower surface having a pocket for receipt therein of said base, said cutouts extending through said lower surface.

3. Apparatus according to claim 2, wherein said base lower surface and said cover lower surface are substantially flush.

4. Apparatus according to claim 2, wherein said cover has extending into its lower surface a recess associated with each cable, each recess communicating with a respective cutout and said pocket.

5. An apparatus according to claim 4, wherein said cover has a generally circular shape.

6. An apparatus according to claim 5, wherein there are four cutouts.

7. An apparatus according to claim 6, wherein said cutouts are generally equally spaced about the cover periphery.

8. An apparatus according to claims 1 or 5 wherein said electrical cables for tapping or splicing are of the type having drain wires and wherein said apparatus further includes at least one grounding contact supported on said upper surface of said base, said grounding contact being configured to receive and electrically connect drain wires from at least two cables.

9. An apparatus according to claim 8, wherein said insulation displacements contacts are disposed generally linearly along said upper surface of said base.

10. An apparatus according to claim 8, wherein cables are received on said base along axes that are obliquely oriented relative to said generally linearly disposed contacts.

11. An apparatus according to claim 10, wherein said cables are received on said base along mutually perpendicularly axes.

12. An apparatus according to claim 11, wherein there are two grounding contacts, one disposed on either side of said generally linearly disposed contacts, said two grounding contacts being commonly electrically connected.

13. An apparatus according claim 12, wherein each of said insulation displacement contacts comprises two slots for receipt therein of insulated conductors.

* * * * *